United States Patent [19]

Inoue

[11] Patent Number: 4,483,570
[45] Date of Patent: Nov. 20, 1984

[54] MAGNETIC BEARING ARRANGEMENT FOR AN ARTIFICIAL SATELLITE

[75] Inventor: Masao Inoue, Hyogo, Japan

[73] Assignee: Mitsubishi Denki Kabushiki Kaisha, Tokyo, Japan

[21] Appl. No.: 469,659

[22] Filed: Feb. 25, 1983

[30] Foreign Application Priority Data

Feb. 26, 1982 [JP] Japan ................................. 57-30417

[51] Int. Cl.$^3$ ............................................. F16C 39/06
[52] U.S. Cl. .................................. 308/10; 244/158 R; 244/166
[58] Field of Search ............. 308/10; 244/158 R, 165, 244/166

[56] References Cited

U.S. PATENT DOCUMENTS

| 3,493,274 | 2/1970 | Emslie | 308/10 |
| 3,493,275 | 2/1970 | Stone | 308/10 |
| 3,565,495 | 2/1971 | Lyman | 308/10 |
| 3,865,442 | 2/1975 | Studer | 308/10 |
| 3,888,553 | 6/1975 | Wehde | 308/10 |
| 3,937,533 | 2/1976 | Veillette | 308/10 |
| 3,955,858 | 5/1976 | Pobeau | 244/166 |
| 4,000,929 | 1/1977 | Studer | 308/10 |

FOREIGN PATENT DOCUMENTS 2702659  7/1978  Fed. Rep. of Germany ........ 308/10

Primary Examiner—R. Skudy
Attorney, Agent, or Firm—Sughrue, Mion, Zinn, Macpeak and Seas

[57] ABSTRACT

A magnetic bearing arrangement for rotor for controlling the attitude of an artificial satellite wherein the rotor has a rotating speed and an axis of rotation which are adjusted in accordance with a change in the attitude of the satellite. The arrangement includes a stator defined by at least three segments, and each stator segment is provided with a permanent magnet to eliminate the necessity of any electromagnet for controlling radial rotor displacement and any sensor for detecting such radial displacement. The apparatus is free from any eddy currents that may cause great resistance to rotation.

3 Claims, 14 Drawing Figures

MAGNETIC BEARING ARRANGEMENT FOR AN ARTIFICIAL SATELLITE

BACKGROUND OF THE INVENTION

1. Field of the Invention

The present invention relates to a magnetic bearing arrangement for an artificial satellite, and more particularly, to a magnetic bearing for a rotor which has a rotating speed and an axis of rotation adjusted in accordance with a change in the attitude of the artificial satellite in order to control it.

2. Description of the Prior Art

The attitude of an artificial satellite is controlled as generally illustrated in FIG. 1. The angles of rotation of an artificial satellite about three axes, X, Y and Z are called its attitude angles designated as $\phi$ (roll), $\theta$ (pitch), and $\psi$ (yaw),respectively. A flywheel usually has an axis of rotation which is in parallel to the axis Y, and rotates at a constant speed. The flywheel is supported by a magnetic bearing so that its axis of rotation may be slightly inclined toward the X or Z axis at an angle $\alpha$ or $\beta$, respectively. Accordingly, it is possible to control the angle $\psi$ about the yaw axis by varying the angle $\alpha$, the angle $\phi$ about the roll axis by varying the angle $\beta$, and the angle $\theta$ about the pitch axis by varying the rotating speed of the flywheel.

The attitude control for the satellite may be performed by an apparatus as shown in FIG. 2. The apparatus includes a rotor 1, an axial displacement sensor 2, an electromagnet 3 providing an attractive force controlled in accordance with an output signal from the sensor 2 to move the rotor 1 to a fixed axial position, a radial displacement sensor 4 for detecting the radial displacement of the rotor 1, an electromagnet 5 providing an attractive force controlled in accordance with an output signal from the sensor 4 to move the rotor 1 to a fixed radial position, a stator 6, and a motor 7 for driving the rotor 1. A pair of sensors 4 and a pair of electromagnets 5 are provided to enable the rotor 1 to be restored to its original position when its axis of rotation has been inclined.

Thus, the six degrees of freedom of the rotor 1, with the exception of its rotatory displacement about its axis of roataion, are completely controlled by the sensor and electromagnet combinations. Therefore, the rotor 1 can be rotated without being brought into any contact with the stator 6. The apparatus is, thus, advantageous in various respects as a system for controlling the attitude of an artificial satellite.

Five sensor and electromagnet combinations are, however, required for effecting the radial control of the rotor 1 along the x and y axes which are prependicular to each other and to the axis of rotation of the rotor 1, designated as the z axis, its axial control along the z axis, and the control of inclination of its axis of rotation, i.e., its angular displacement about the x or y axis.

Another example of a system for actively controlling five modes of operation, namely an axial translation, two radial translations and two tilting motions, is found in a paper by R. S. Sindlinger entitled "Magnetic Bearing Momentum Wheels with Vernier Gimballing Capability for 3-Axis Active Attitude Control and Energy Storage", appearing in the 1976 IFAC Symposium *Automatic Control in Space.*

In the magnetic bearing wheels as hereinabove described, the radial displacement electromagnets do not produce a magnetic flux which is uniform along the circumference of the the wheel. Therefore, an eddy current appears on the rotor and creates resistance to its rotation. Since all the control is effected by an electromagnetic force, the apparatus consumes a lot of power even during normal operation, and requires a complicated control circuit.

In another publication entitled "Satellite Flywheels with Magnetic Bearings and Passive Radial Centering" by P. C. Poubeau, appearing in the AIAA *Journal of Spacecraft,* vol 17, No. 2, Mar.-Apr., 1980, the use of passive permanent magnet radial bearings is disclosed. However, the stator is of one-piece with the permanent magnets being in the form of continuous annular rings. The radial bearing, the axial bearing and the radial dampers are separated from each other and spaced along the axis of the wheel. The radial damper does not provide for the positive control of the inclination of the axis of rotation.

SUMMARY OF THE INVENTION

In view of these drawbacks, it is an object of the present invention to achieve a simplified control circuit by employing a permanent magnet for a bearing, and a smaller number of sensors and electromagnets to thereby reduce the loss of power due to eddy currents during rotation.

The present invention provides an improvement in the magnetic bearing for controlling any displacement along its axis of rotation by adjusting the attractive force of a permanent magnet electromegnetically, characterized by including at least three stator segments, a permanent magnet provided for each stator segment, and an electromagnet provided opposite to each permanent magnet for achieving the axial control of each stator segment, whereby the stator segments are positionally controlled independently of one another to effect the automatic control of the inclination of the axis of rotation.

DETAILED DESCRIPTION OF THE INVENTION

Figure 1:
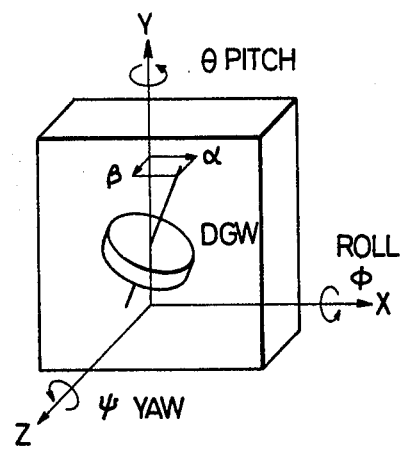
FIG. 1 illustrates an outline of the attitude control of an artificial satellite.
Figure 2A:
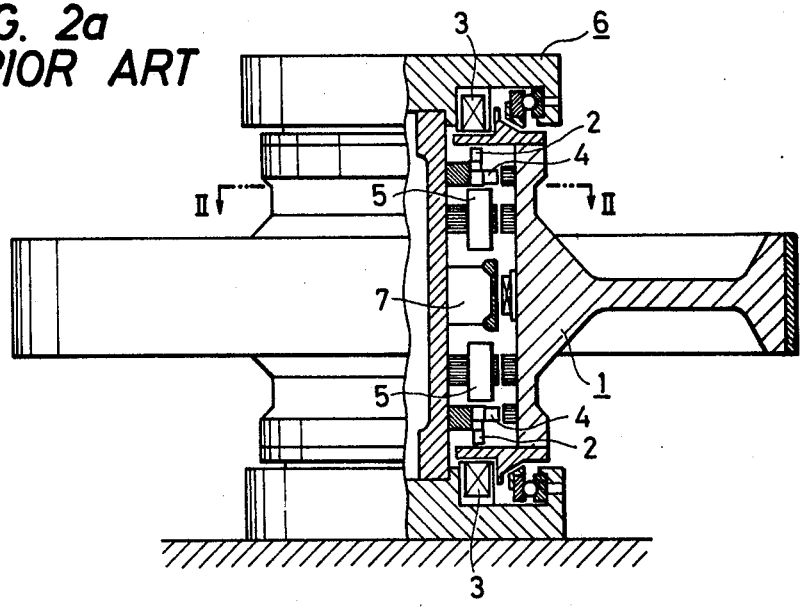
FIG. 2(a) is a side elevational view, partly in section of a known magnetic bearing apparatus.
Figure 2B:
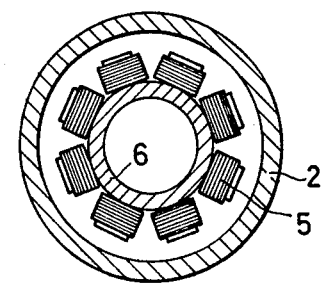
FIG. 2(b) is a bottom plan view of the apparatus shown in FIG. 2(a).
Figure 3A:
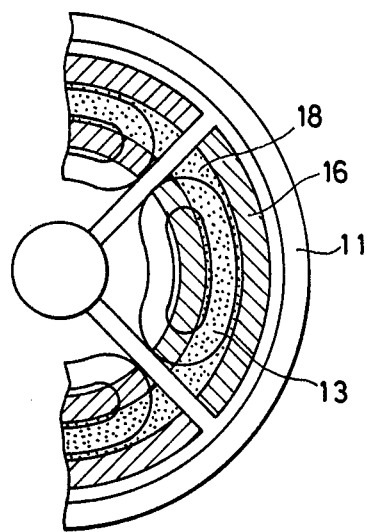
FIG. 3(a) is a fragmentary top plan view of a magnetic bearing for the attitude control of an artificial satellite embodying the present invention.
Figure 3B:
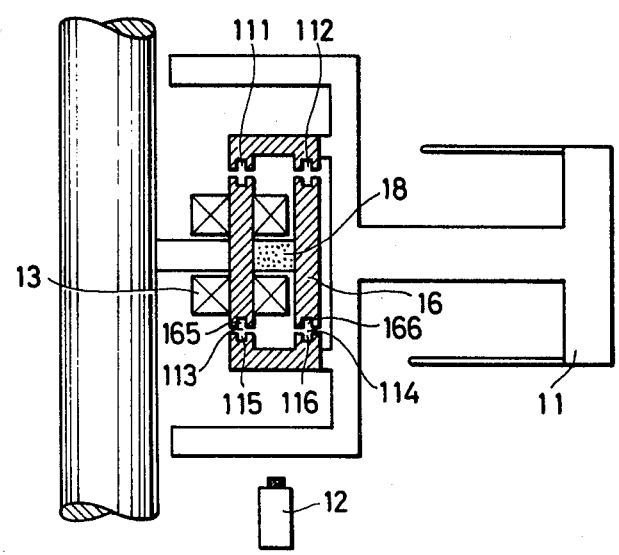
FIG. 3(b) is a side elevational view, partly in section, of the apparatus shown in FIG. 3(a).
Figure 4:
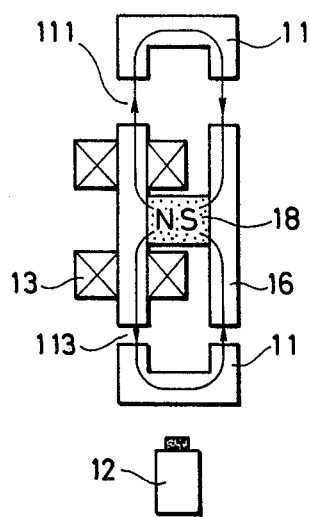
FIG. 4 is a schematic view illustrating the axial control achieved by the apparatus shown in FIGS. 3(a) and (b).

Referring first to FIGS. 3(a) and (b) of the drawings, there is shown a magnetic bearing arrangement embodying the present invention. The arrangement includes a rotor 11 which is bifurcated at its inner circumference, and a stator 16 composed of four segments as shown in FIG. 3(a). The rotor is disposed for rotation about an axis of rotation and spaced radially outwardly from the stator as shown in FIG. 3(b). Each segment of the stator 16 is provided with a radially magnetized permanent magnet 18, and a pair of axially aligned electromagnets 13 between which the permanent magnet 18 is disposed, as shown in FIG. 4. Radially spaced apart gaps are provided between the rotor 11 and the stator 16, i.e., an inner gap 111 and an inner gap 113 and an outer gap 114 below the stator 16, as shown in FIG. 3(b). The mutually facing portions of the rotor 11 and the stator 16, between which the gaps are defined, have mutually facing recesses 115 and 165, and 116 and 166, as shown in, for example, FIG. 3(b). A sensor 12 is provided for detecting axial displacement of the rotor.

Various aspects of operation of the magnetic bearing as hereinabove described will now be described.

[1] Axial Control

Referring to FIG. 4, the magnetic flux of the permanent magnet 18 flows up through the upper inner gap 111, and down through the lower inner gap 113. If the rotor 11 is displaced upwardly, the upper gap 111 is widened, while the lower gap 113 is narrowed. This change is detected by the sensor 12, and depending on the amount of the change, a certain amount of electric current is supplied to the electromagnets 13 to raise the density of the magnetic flux in the upper gap 111 and lower the same in the lower gap 113 so that an increased downward attractive force may be generated to rectify displacement of the rotor 11. Thus, the attractive force of the permanent magnet is adjusted in accordance with any axial displacement of the rotor 11 to control its axial displacement. By virtue of its permanent magnet, the magnetic bearing has the advantage that the electromagnets 13 require only a very small amount of electric current, since the attractive force of the permanent magnet is vertically balanced when the rotor 11 is in the neutral position of the bearing.

[2] Radial Control

Figure 5:
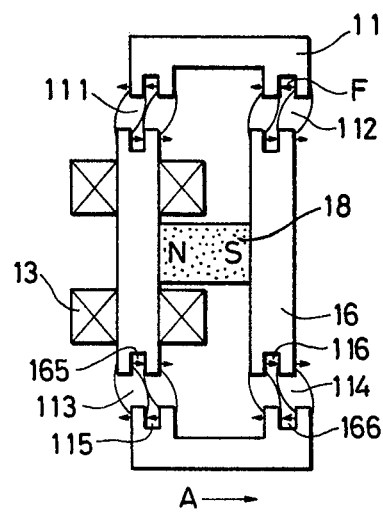
FIG. 5 is a schematic view illustrating the radial control achieved by the apparatus shown in FIGS. 3(a) and (b).

The radial control of the magnetic bearing is of a passive nature and does not require any particular sensor, coil or like part. FIG. 5 shows the rotor in a slightly radially displaced position. The recesses in the mutually facing portions of the rotor and the stator define teeth which increase the density of the magnetic flux in the gaps 111 to 114. If the rotor 11 is displaced radially outwardly in the direction of an arrow A, the flow of the magnetic flux is directed to the sides of the teeth, and there results an attractive force F having a direction opposite to that of the radial displacement of the rotor. The attractive force of the permanent magent works reliably against any such radial displacement of the rotor; therefore, no positive control is ever required therefor.

[3] Control of the Axis of Rotation upon Inclination Thereof

Figure 6:
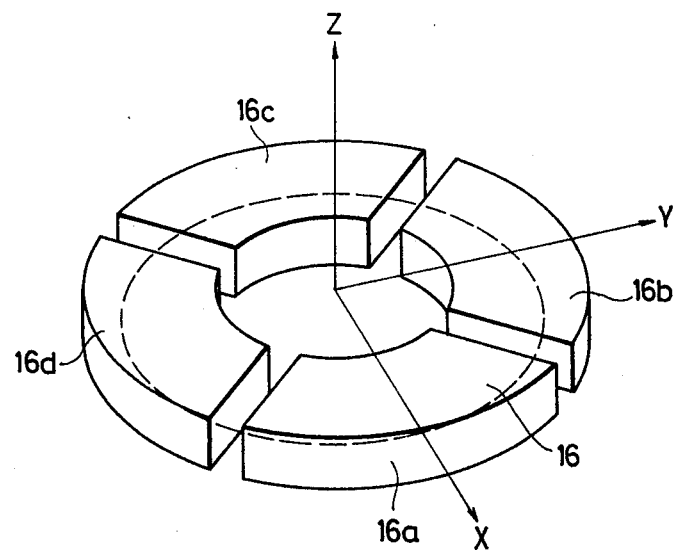
FIG. 6 is a schematic view illustrating the control of inclination of the axis of rotation achieved by the apparatus shown in FIGS. 3(a) and (b).

Referring to FIG. 6, the stator 16 is comprised of four segments 16a, 16b, 16c and 16d intended for controlling any displacement of the axis of rotation. If the rotor has made a slight angle or rotation about the x-axis, the rotor is displaced upwardly relative to the stator segment 16b, and downwardly relative to the stator segment 16d. Accordingly, the rotary displacement of the rotor about the x-axis is rectified if the axial control of the rotor is effected relative to the stator segments 16b and 16d. The same is true of the displacement of the rotor about the x-axis.

Figure 7A:
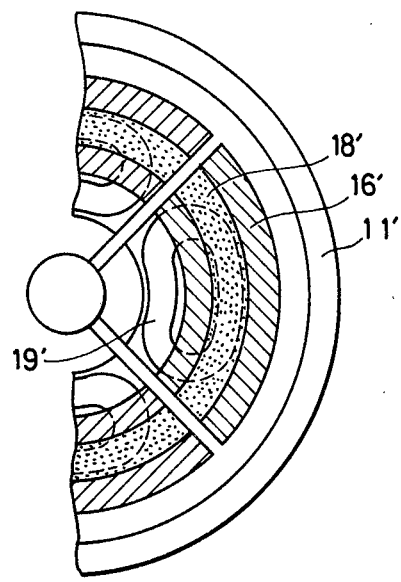
FIG. 7(a) is a fragmentary top plan view of a magnetic bearing for the attitude control of an artificial satellite according to another embodiment of the present invention.
Figure 7B:
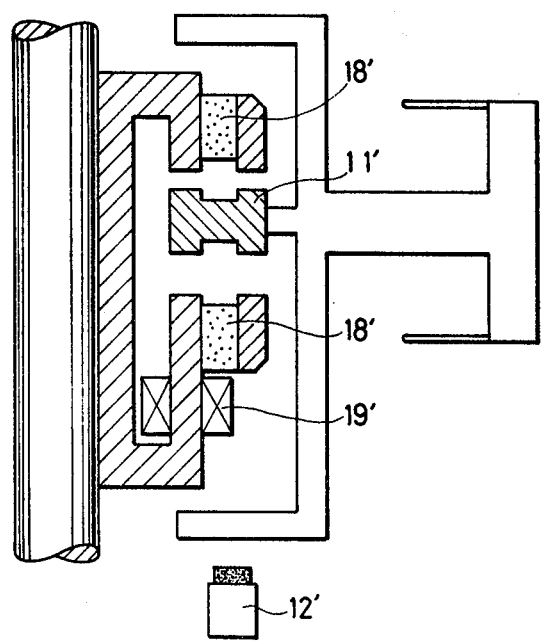
FIG. 7(b) is a side elevational view, partly in section, of the apparatus shown in FIG. 7(a).

Referring to FIGS. 7(a) and 7(b), there is shown another embodiment of the present invention. The apparatus shown in FIGS. 7(a) and 7(b) is different from the apparatus of FIGS. 3(a) and 3(b) in that it has a portion of a rotor 11' disposed within a stator 16'.

The following is a description of the operation of the apparatus shown in FIGS. 7(a) and 7(b).

[1] Axial Control

Figure 8:
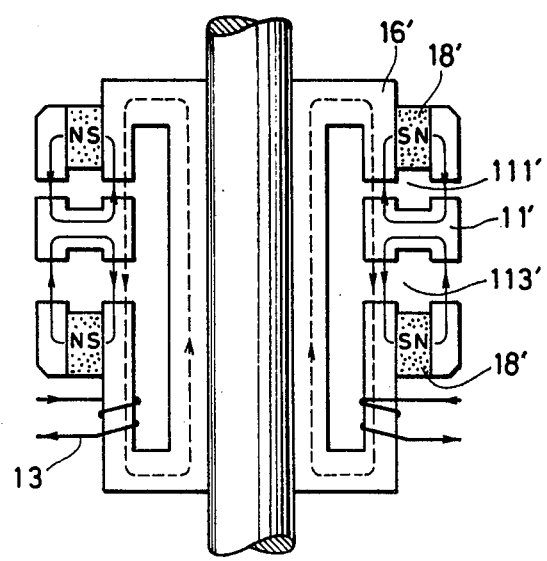
FIG. 8 is a schematic view illustrating the axial control achieved by the apparatus shown in FIGS. 7(a) and (b).

As shown in FIG. 8, an upper gap 111' and a lower gap 113' are defined between the rotor portion 11' and the stator 16', and the magnetic flux of the permanent magnet 18' flows up through the upper gap 111', and down through the lower gap 113', as indicated by solid arrowlines. If the rotor position 11' is displaced upwardly, the upper gap 111' is narrowed, while the lower gap 113' is widened. This displacement is detected by the sensor 12', and depending on the amount of such displacement, a certain amount of electric current is supplied to the electromagnet 13' to develop a magnetic flux as indicated by broken lines. Accordingly, the density of the magnetic flux is lowered in the upper gap 111', and raised in the lower gap 113', whereby an increased downward attractive force is generated to rectify the displacement of the rotor portion 11'. Thus, the attractive force of the permanent magnet is adjusted in accordance with any axial displacement of the rotor portion 11' to control its axial displacement. By virtue if its permanent magnet, the magnetic bearing has the advantage that the electromagnet 13' requires only a very small amount of electric current, since the attractive force of the permanent magnet 18' is vertically balanced when the rotor 11 stays in the neutral position of the bearing.

[2] Radial Control

Figure 9:
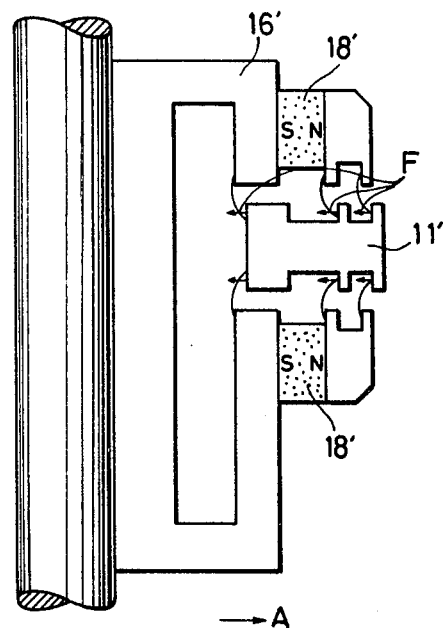
FIG. 9 is a schematic view illustrating the radial control achieved by the apparatus shown in FIGS. 7(a) and (b).

The radial control of the magnetic bearing is of a passive nature, and does not require any particular sensor, coil or like device. FIG. 9 shows the rotor in a slightly radially displaced position. The recesses in the mutually facing portions of the rotor and the stator define teeth which increase the density of the magnetic flux in the gaps between the rotor and the stator. If the rotor 11 is displaced radially outwardly in the direction of an arrow A, the flow of the magnetic flux is directed to the sides of the teeth, and there results an attractive force F having a direction opposite to that of the radial displacement of the rotor. The attractive force of the permanent magnet works reliably against any such radial displacement of the rotor and therefore, no positive control is ever required therefor.

[3] Control of the Axis of Rotation upon Inclination Thereof

Figure 10:
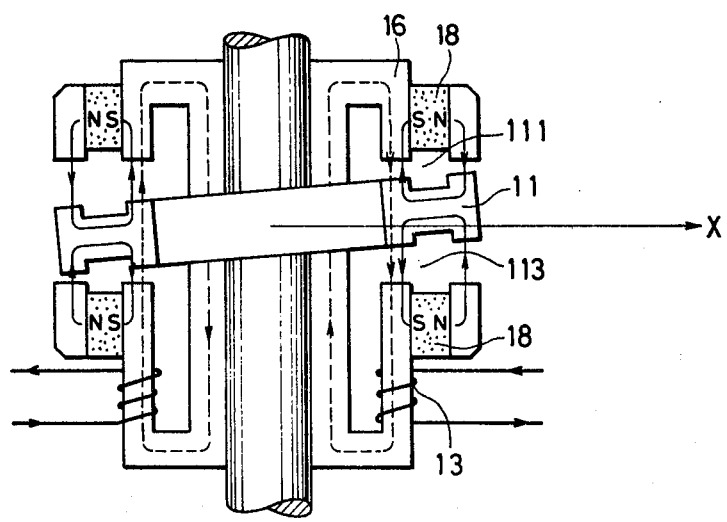
FIG. 10 is a schematic view illustrating the control of inclination of the axis of rotation achieved by the apparatus shown in FIGS. 7(a) and (b).

If the rotor 11 makes a slight angle of rotation about the y-axis, those two of the four bearing segments which stay on the x-axis have different gaps between the rotor and the stator, as shown in FIG. 10. If an electric current is supplied to the electro magnet 13, the magnetic flux flowing through each stator segment 16 flows in opposite directions on the + and − sides of the x-axis. Accordingly, an attractive force is generated to lower the rotor 11 on the + side of the x-axis and lift it on the − side thereof, whereby the axis of rotation of the bearing can be controlled satisfactorily against any inclination. Any rotatory displacement of the rotor about the x-axis can likewise be rectified by utilizing the control coils connected to the + and − sides of the y-axis.

Figure 11:
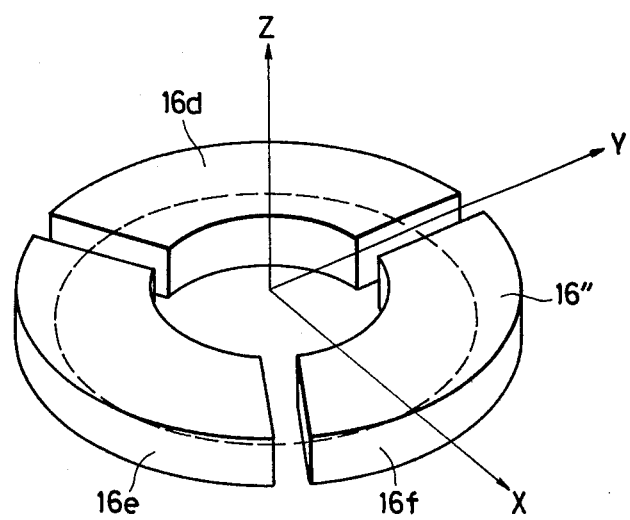
FIG. 11 is a perspective view of a three-part bearing embodying the present invention.

Although the apparatus has been described as having a stator composed of four segments, it is also possible to employ a stator 16″ composed of three segments 16d, 16e and 16f as shown in FIG. 11, or any other appropriate number of segments, though different control circuits may have to be provided.

The magnetic bearing of this invention comprises three of four segments each provided with a permanent magnet which enables the axial positional control of the rotor, and simultaneously accomplishes the control of the rotor against any rotatory displacement. The apparatus does not require any sensor or electromagnet for the radial position control of the rotor. Therefore, the apparatus of this invention is simple in construction, and is free from any eddy currents of the nature generated by electromagnets for radial position control, resulting advantageously in a drastically reduced resistance to rotation.

What is claimed is:

1. A magnetic bearing arrangement for controlling the attitude of an artifical satellite having an axis of rotation comprising:

a stator having at least three segments, each of said segments being provided with a permanent magnet and an electromagnet for axial control;

a rotor disposed for rotation about said axis of rotation and spaced radially outwardly of said stator; and sensor means carried by said stator for detecting any axial displacement of said rotor and controlling actuation of said electromagnet to thereby rectify said axial displacement and simultaneously any inclination of said rotor relative to the axis of rotation of said rotor;

said rotor being bifurcated along its inner circumference with said stator being interposed between the axially bifurcated portions of said rotor and with the mutually facing portions of said rotor and said stator being formed with mutually facing recesses having portions on opposite sides thereof which define there-between two gaps which are radially spaced from each other relative to said axis of rotation which serves for the radial position control of said rotor when any radial displacement thereof has occurred.

2. A magnetic bearing arrangement as set forth in claim 1 wherein each of said permanent magnets is magnetized radially relative to said rotor.

3. A magnetic bearing arrangement as set forth in claim 1 wherein said stator segments are symmetrical with respect to said axis of rotation.

* * * * *